(12) United States Patent
Sato et al.

(10) Patent No.: US 10,526,969 B2
(45) Date of Patent: Jan. 7, 2020

(54) COMPRESSED AIR ENERGY STORAGE POWER GENERATION DEVICE AND COMPRESSED AIR ENERGY STORAGE POWER GENERATION METHOD

(71) Applicant: Kobe Steel, Ltd., Hyogo (JP)

(72) Inventors: Takashi Sato, Takasago (JP); Masaki Matsukuma, Takasago (JP); Hiroki Saruta, Takasago (JP); Kanami Sakamoto, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 15/772,259

(22) PCT Filed: Oct. 20, 2016

(86) PCT No.: PCT/JP2016/081080
§ 371 (c)(1),
(2) Date: Apr. 30, 2018

(87) PCT Pub. No.: WO2017/077867
PCT Pub. Date: May 11, 2017

(65) Prior Publication Data
US 2018/0313267 A1 Nov. 1, 2018

(30) Foreign Application Priority Data
Nov. 6, 2015 (JP) .................................. 2015-218082

(51) Int. Cl.
*F02C 6/16* (2006.01)
*F28D 20/00* (2006.01)

(52) U.S. Cl.
CPC .......... *F02C 6/16* (2013.01); *F05D 2260/213* (2013.01); *F28D 2020/0065* (2013.01)

(58) Field of Classification Search
CPC ... F02C 6/16; F02C 9/16; Y02E 60/15; F05D 2260/213; F05D 2270/301; F05D 2270/20; F28D 2020/0065
(Continued)

(56) References Cited

U.S. PATENT DOCUMENTS 3,831,373 A     8/1974   Flynt
3,893,300 A *   7/1975   Connell .................... F02C 6/14
                                                                                               60/39.183

(Continued)

FOREIGN PATENT DOCUMENTS

EP         2559881 A2    2/2013
JP       H07-042573 A    2/1995
(Continued)

OTHER PUBLICATIONS

International Search Report issued in PCT/JP2016/081080; dated Dec. 13, 2016.
(Continued)

*Primary Examiner* — Hoang M Nguyen
(74) *Attorney, Agent, or Firm* — Studebaker & Brackett PC (57) ABSTRACT

A compressed air energy storage power generation device equipped with: a compressor mechanically connected to a motor; a first pressure storage tank storing compressed air from the compressor; an expansion device driven by compressed air from the tank; a generator mechanically connected to the expansion device; a first heat exchanger that exchanges heat between a heat medium and the compressed air supplied from the compressor to the tank; a second heat exchanger that exchanges heat between the heat medium and the compressed air supplied from the tank to the expansion device; a pressure sensor that detects the state of charge (SOC) of the tank; SOC adjustment units that adjusts the (Continued)

SOC; and a control device. The control device controls the SOC adjustment units such that the detected SOC is within an optimal SOC range while satisfying the requested power. Thus, in this compressed air energy storage power generation device the SOC is controlled so as to be within an optimal SOC range, so the operating efficiency can be improved.

14 Claims, 3 Drawing Sheets

(58) Field of Classification Search
USPC .................................. 60/650, 659, 682–684
See application file for complete search history.

(56) References Cited

U.S. PATENT DOCUMENTS

| | | | |
|---|---|---|---|
| 4,237,692 A | 12/1980 | Ahrens et al. | |
| 4,739,620 A * | 4/1988 | Pierce | F03G 6/00 60/641.8 |
| 4,797,563 A * | 1/1989 | Richardson | F02C 3/00 290/43 |
| 6,244,034 B1 * | 6/2001 | Taylor | F02C 6/16 60/39.094 |
| 2007/0245735 A1 * | 10/2007 | Ashikian | F02C 1/02 60/659 |
| 2011/0127004 A1 | 6/2011 | Freund et al. | |
| 2013/0061591 A1 | 3/2013 | Bove et al. | |
| 2014/0000275 A1 * | 1/2014 | Kesseli | F02C 7/22 60/776 |

FOREIGN PATENT DOCUMENTS

| | | |
|---|---|---|
| JP | 2013-064399 A | 4/2013 |
| JP | 2013-512410 A | 4/2013 |

OTHER PUBLICATIONS

Extended European Search Report issued by the European Patent Office dated May 21, 2019, which corresponds to EP16861931.0-1007 and is related to U.S. Appl. No. 15/772,259.

* cited by examiner

COMPRESSED AIR ENERGY STORAGE POWER GENERATION DEVICE AND COMPRESSED AIR ENERGY STORAGE POWER GENERATION METHOD

TECHNICAL FIELD

The present invention relates to a compressed air energy storage power generation device and a compressed air energy storage power generation method.

BACKGROUND ART

A storage battery that, when power is excessively generated, stores electricity and compensates for power shortage with the electricity is representative of the techniques to smooth the output of power generation utilizing irregularly fluctuating and unstable energy such as renewable energy. Sodium-sulfur batteries, redox flow batteries, lithium batteries, lead batteries and the like are known as examples of large-capacity storage batteries. These batteries are all chemical secondary batteries, and can output the stored energy only in the form of electricity.

In addition, the technology referred to as compressed air energy storage (CAES) configured to store, in place of electricity, compressed air discharged from a compressor when power is excessively generated and to reconvert the compressed air to electricity by an air turbine power generator or the like when needed is known as another equipment for smoothing (Patent Document 1).

CITATION LIST

Patent Document

Patent Document 1: JP 2013-512410 A

SUMMARY OF THE INVENTION

Problem to be Solved by the Invention

In the CAES power generation device like Patent Document 1, special consideration is not given to the amount of compressed air to be stored. In particular, the index referred to as SOC (State Of Charge) indicating filling ratio of the compressed air to an allowable pressure value of a pressure accumulation tank is not suggested. The CAES power generation device has an optimal SOC range in which operating efficiencies of a compressor and an expander are improved. The operating condition within the optimal SOC range is sometimes not satisfied only by operating in accordance with a normal charge/discharge command. In addition, exhaustion of the compressed air stored in the pressure accumulation tank cannot respond to a new discharge command, and full filling of the compressed air into the pressure accumulation tank cannot respond to a new charge command.

It is an object of the present invention to improve an operating efficiency of a compressed air energy storage power generation device by optimization of SOC.

Means for Solving the Problem

A first aspect of the present invention provides a compressed air energy storage power generation device including: a compressor that is mechanically connected to a driving machine and compresses air; a first pressure accumulation unit that stores compressed air compressed by the compressor; an expander driven by compressed air supplied from the first pressure accumulation unit; a power generator mechanically connected to the expander; a first heat exchanger that exchanges heat between a heat medium and the compressed air supplied from the compressor to the first pressure accumulation unit; a second heat exchanger that exchanges heat between the heat medium and the compressed air supplied from the first pressure accumulation unit to the expander; an SOC detection unit that detects SOC of the first pressure accumulation unit; an SOC regulating unit that regulates the SOC of the first pressure accumulation unit; and a control device that controls the SOC regulating unit such that the SOC detected by the SOC detection unit is within an optimal SOC range while satisfying a requested power.

According to this configuration, the power generation device is operated within the optimal SOC range by regulating the SOC by the SOC regulating unit, and thereby an operating efficiency can be improved. Here, the SOC is a value indicating filling ratio of the compressed air to an allowable pressure value of the first pressure accumulation unit. SOC=0% indicates a state that the compressed air effectively usable for power generation does not exist in the first pressure accumulation unit, and SOC=100% indicates a state that the compressed air is filled to the allowable pressure value of the first pressure accumulation unit. In addition, the requested power is power requested as a required amount from a supply destination of the power generated by the power generator. In particular, when the driving machine is an electric motor or the like utilizing the power generated by irregularly fluctuating renewable energy, irregularly fluctuating power can be also leveled.

The SOC regulating unit preferably includes a heat storage unit that is fluidly connected to the first heat exchanger and the second heat exchanger and stores the heat medium, and a heating unit that heats the heat medium within the heat storage unit.

By providing the heat storage unit and the heating unit, without wasting the power generated for regulating the SOC, it is possible to convert power to heat energy in the heating unit and store the heat energy in the heat storage unit.

When the SOC of the first pressure accumulation unit is larger than the optimal SOC range, the control device may supply the compressed air in the first pressure accumulation unit to the expander and drive the power generator to generate power, and may supply the generated power of the power generator to the heating unit. In addition, when the SOC of the first pressure accumulation unit is smaller than the optimal SOC range, the control device may produce compressed air by the driving machine to supply the compressed air to the first pressure accumulation unit.

In this way, it is possible to provide a concrete method for regulating the SOC utilizing the heating unit.

The SOC regulating unit preferably include a second pressure accumulation unit.

By providing the second pressure accumulation unit, it is possible to regulate the SOC of the first pressure accumulation unit.

Firstly, when the SOC of the first pressure accumulation unit is larger than the optimal SOC range, the compressed air is supplied to the second pressure accumulation unit so as not to increase the SOC of the first pressure accumulation unit. In addition, during power generation, the compressed air in the first pressure accumulation unit is supplied to the expander to decrease the SOC of the first pressure accumulation unit. When an internal pressure of the first pressure accumulation unit is higher than an internal pressure of the second pressure accumulation unit, the compressed air in the first pressure accumulation unit is supplied to the second pressure accumulation unit to decrease the SOC of the first pressure accumulation unit.

Secondly, when the SOC is smaller than the optimal SOC range, the compressed air is supplied to the first pressure accumulation unit to increase the SOC. In addition, during power generation, the compressed air in the second pressure accumulation unit is supplied to the expander so as not to decrease the SOC of the first pressure accumulation unit. When the internal pressure of the first pressure accumulation unit is lower than the internal pressure of the second pressure accumulation unit, the compressed air in the second pressure accumulation unit is supplied to the first pressure accumulation unit to increase the SOC of the first pressure accumulation unit.

The control device may supply the compressed air to the second pressure accumulation unit and supply the compressed air in the first pressure accumulation unit to the expander when the SOC of the first pressure accumulation unit is larger than the optimal SOC range, and may supply the compressed air in the first pressure accumulation unit to the second pressure accumulation unit when the internal pressure of the first pressure accumulation unit is higher than the internal pressure of the second pressure accumulation unit. In addition, the control device may supply the compressed air to the first pressure accumulation unit and supply the compressed air in the second pressure accumulation unit to the expander when the SOC of the first pressure accumulation unit is smaller than the optimal SOC range, and may supply the compressed air in the second pressure accumulation unit to the first pressure accumulation unit when the internal pressure of the first pressure accumulation unit is lower than the internal pressure of the second pressure accumulation unit.

In this way, it is possible to provide a specific method for regulating the SOC utilizing the second pressure accumulation unit.

The SOC regulating unit may include an air release valve for releasing the compressed air from the first pressure accumulation unit, and when the SOC of the first pressure accumulation unit is larger than the optimal SOC range, the control device may open the air release valve to release the compressed air from the first pressure accumulation unit.

By releasing the compressed air from the first pressure accumulation unit by the air release valve, the SOC of the first pressure accumulation unit can be decreased with a simple configuration such that the SOC is within the optimal SOC range. In this case, the SOC of the first pressure accumulation unit can be decreased without driving the expander, so the power generator does not generate power and surplus power is not generated.

Preferably, regardless of the requested power, the control device controls the SOC regulating unit to decrease the SOC when the SOC detected by the SOC detection unit is within a predetermined high range, and controls the SOC regulating unit to increase the SOC when the SOC detected by the SOC detection unit is within a predetermined low range.

By such an SOC control, it is possible to prevent the first pressure accumulation unit from disabling further accumulation of pressure due to reaching a capacity upper limit, and prevent the first pressure accumulation unit from disabling further generation of power due to reaching a capacity lower limit. Here, the upper limit of the predetermined high range may be determined as the allowable pressure value of the first pressure accumulation unit. The lower limit of the predetermined high range may be determined such that, even if the pressure of the first pressure accumulation unit rises due to the delay in response of the SOC detection unit or the SOC regulating unit after detecting by the SOC detection unit that the SOC reaches the vicinity of the upper limit and starting regulation for decreasing the SOC, the pressure of the first pressure accumulation unit does not rise to the upper limit. In addition, the lower limit of the predetermined low range may be determined as a state that the compressed air effectively usable for power generation does not exist in the first pressure accumulation unit. The upper limit of the predetermined low range may be determined such that, even if the pressure of the first pressure accumulation unit decreases due to the delay in response of the SOC detection unit or the SOC regulating unit after detecting by the SOC detection unit that the SOC reaches the vicinity of the lower limit and starting regulation for increasing the SOC, the state that the compressed air effectively usable for power generation does not exist in the first pressure accumulation unit is not created.

A second aspect of the present invention provides a compressed air energy storage power generation method including: a step of compressing air; a step of cooling compressed air whose temperature is increased in the compression step; a step of storing the cooled compressed air in a first pressure accumulation unit; a step of regulating an SOC of the first pressure accumulation unit so as to be within an optimal SOC range; a step of heating the stored compressed air; and a step of generating power by expanding the heated compressed air.

Effect of the Invention

According to the present invention, the compressed air energy storage power generation device is operated within the optimal SOC range by regulating the SOC by the SOC regulating unit, and thereby the operating efficiency can be improved.

DESCRIPTION OF EMBODIMENTS

Hereinafter, embodiments of the present invention will be described with reference to the drawings.

First Embodiment

Figure 1:
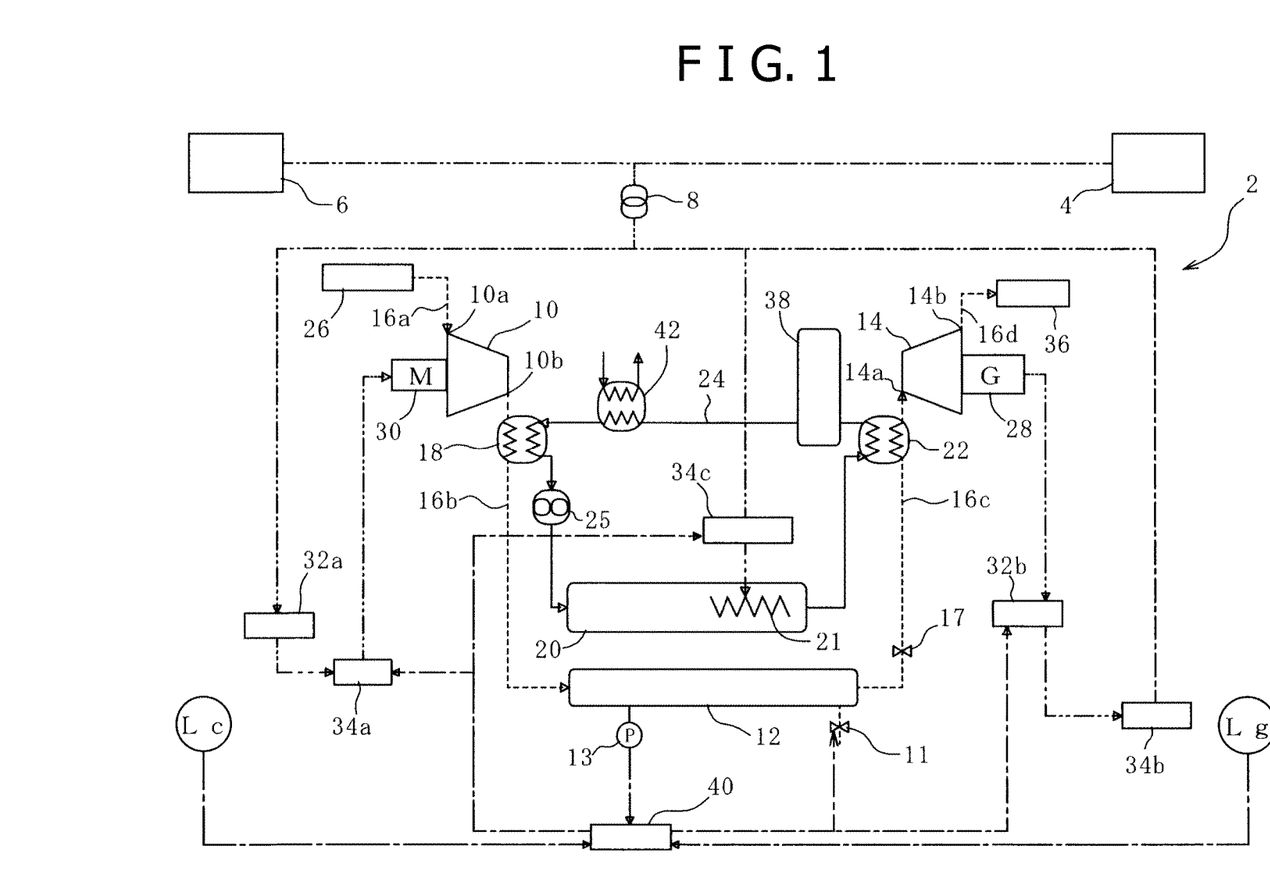
FIG. 1 is a schematic configuration diagram of a compressed air energy storage power generation device according to a first embodiment of the present invention.

FIG. 1 is a schematic configuration diagram of a compressed air energy storage (CAES) power generation device 2. The CAES power generation device 2 smooths the power supplied via a power transmission/reception facility 8 configured by a transformer and the like from a power plant 6 utilizing renewable energy, such as a wind power plant or a photovoltaic power plant, and outputs power to a power system 4 of a supply destination.

The configuration of the CAES power generation device 2 will be described with reference to FIG. 1.

The CAES power generation device 2 includes an air path shown by dashed lines, and a heat medium path shown by solid lines. A compressor 10, a first pressure accumulation tank (first pressure accumulation unit) 12, and an expander 14 are mainly provided in the air path, and these are fluidly connected by air pipes 16a to 16d in which air flows therein. A first heat exchanger 18, a heat medium tank 20, and a second heat exchanger 22 are mainly provided in the heat medium path, and these are fluidly connected by heat medium pipes 24 in which a heat medium flows therein.

First, the air path will be described with reference to FIG. 1. In the air path, air suctioned through the air pipe 16a to which an intake filter 26 is attached is compressed in the compressor 10 and then is stored in the first pressure accumulation tank 12. The compressed air stored in the first pressure accumulation tank 12 is supplied to the expander 14 and then is used in power generation by a power generator 28.

The compressor 10 is driven by a motor (driving machine) 30 mechanically connected thereto. Power generated in the power plant 6 is supplied via a converter 32a and an inverter 34a to the motor 30, and the motor 30 is driven by this power to operate the compressor 10. Hereinafter, the power supplied from the power plant 6 to the motor 30 is referred to as input power. A discharge port 10b of the compressor 10 is fluidly connected through the air pipe 16b to the first pressure accumulation tank 12. When the compressor 10 is driven by the motor 30, the compressor 10 suctions air through a suction port 10a via the air pipe 16a, compresses the air and discharges the compressed air through the discharge port 10b, and then pumps the compressed air to the first pressure accumulation tank 12. The compressor 10 is a screw compressor in the present embodiment, but may be a turbo compressor, a scroll compressor, a reciprocating compressor and the like. In addition, the single compressor 10 is provided in the present embodiment, but a plurality of compressors 10 may be arranged in parallel with one another.

The first pressure accumulation tank 12 stores the compressed air pumped from the compressor 10. That is, energy can be accumulated as the compressed air in the first pressure accumulation tank 12. The first pressure accumulation tank 12 is fluidly connected through the air pipe 16c to the expander 14, and the compressed air stored in the first pressure accumulation tank 12 is supplied through the air pipe 16c to the expander 14. However, the first pressure accumulation tank 12 is generally large in capacity, so it is difficult from the viewpoint of cost that the first pressure accumulation tank 12 is thermally insulated from outside air. Consequently, in order to prevent heat loss due to discharge of the compressed air to the atmosphere, the storage temperature for the compressed air is set to be nearly the same as the atmospheric temperature or to be slightly higher or lower than the atmospheric temperature. A pressure sensor (SOC detection unit) 13 is installed at the first pressure accumulation tank 12, and it is possible to measure a pressure of the compressed air therein and check an SOC of the first pressure accumulation tank 12. Here, the SOC indicates filling ratio of the compressed air to an allowable pressure value of the first pressure accumulation unit. SOC=0% indicates a state that the compressed air effectively usable for power generation does not exist in the first pressure accumulation unit, and SOC=100% indicates a state that the compressed air is filled to the allowable pressure value of the first pressure accumulation unit. In the air pipe 16c extending from the first pressure accumulation tank 12 to the expander 14, a valve 17 for permitting or blocking the flow of the compressed air is provided. By opening or closing the valve 17, whether or not the compressed air is supplied to the expander 14 can be changed.

The power generator 28 is mechanically connected to the expander 14. The expander 14 to which the compressed air is supplied through an air supply port 14a is operated by the supplied compressed air to drive the power generator 28. The power generator 28 is electrically connected to the outside power system 4 (see alternate long and short dash lines in FIG. 1), and power (hereinafter, referred to as the generated power) generated by the power generator 28 is supplied via an inverter 32b and a converter 34b to the power system 4 of the supply destination. In addition, the air expanded in the expander 14 is discharged through the air pipe 16d from a discharge port 14b via an exhaust silencer 36 to the outside. The expander 14 is a screw expander in the present embodiment, but may be a turbo expander, a scroll expander, a reciprocating expander and the like. In addition, the single expander 14 is provided in the present embodiment, but a plurality of expanders 14 may be arranged in parallel with one another.

Next, the heat medium path will be described. In the heat medium path, heat generated in the compressor 10 is recovered to the heat medium in the first heat exchanger 18. The heat medium in which the heat is recovered is stored in the heat medium tank 20, and is supplied from the heat medium tank 20 to the second heat exchanger 22, and the heat is returned to the compressed air before being expanded by the expander 14 in the second heat exchanger 22. The heat medium cooled to low temperature by heat exchange in the second heat exchanger 22 is supplied to a heat medium return tank 38. Then, the heat medium is supplied again from the heat medium return tank 38 to the first heat exchanger 18, and the heat medium is circulated in this manner. Here, a kind of the heat medium is not particularly limited, and for example, a heat medium such as mineral oil or a glycol heat medium can be used.

The first heat exchanger 18 exchanges heat between the heat medium within the heat medium pipe 24 and the compressed air within the air pipe 16b for fluidly connecting the compressor 10 and the first pressure accumulation tank 12, and recovers compression heat generated in the compressor 10 to the heat medium. That is, in the first heat exchanger 18, the temperature of the compressed air drops and the temperature of the heat medium rises. The heat medium heated to high temperature here is supplied through the heat medium pipe 24 to the heat medium tank 20.

A pump 25 for allowing flow of the heat medium is provided in the heat medium pipe 24 extending from the first heat exchanger 18 to the heat medium tank 20. By the pump 25, the heat medium circulates in the heat medium pipe 24.

The heat medium tank 20 is a steel tank whose circumference is covered by a heat insulating material insulated from the atmosphere. In the heat medium tank 20, the heat medium heated to high temperature in the first heat exchanger 18 is stored. In the heat medium tank 20, a heater (heating unit) 21 for heating the heat medium in the inside thereof is provided. The heater 21 is electrically connected to the power generator 28 via the inverter 32b, the converter 34b, and a power regulator 34c, and is operated by the generated power of the power generator 28. The heat medium stored in the heat medium tank 20 is supplied through the heat medium pipe 24 to the second heat exchanger 22.

The second heat exchanger 22 exchanges heat between the heat medium within the heat medium pipe 24 and the compressed air within the air pipe 16c for fluidly connecting the first pressure accumulation tank 12 and the expander 14, and heats the compressed air before being expanded by the expander 14. That is, in the second heat exchanger 22, the temperature of the compressed air rises and the temperature of the heat medium drops. The heat medium cooled to low temperature in the second heat exchanger 22 is supplied through the heat medium pipe 24 to the heat medium return tank 38.

The heat medium return tank 38 stores the heat medium cooled to low temperature by heat exchange in the second heat exchanger 22. Therefore, the temperature of the heat medium within the heat medium return tank 38 is usually lower than that of the heat medium within the heat medium tank 20. The heat medium stored in the heat medium return tank 38 is supplied through the heat medium pipe 24 to the first heat exchanger 18.

A heat medium cooler 42 is provided in the heat medium pipe 24 extending from the heat medium return tank 38 to the first heat exchanger 18. The heat medium cooler 42 of the present embodiment is a heat exchanger, and exchanges heat between cooling water supplied from the outside and the heat medium within the heat medium pipe 24 extending from the heat medium return tank 38 to the first heat exchanger 18 to decrease the temperature of the heat medium. Since the temperature of the heat medium flowing into the first heat exchanger 18 can be maintained at a predetermined temperature by the heat medium cooler 42, heat exchange in the first heat exchanger 18 can be stably performed and the charge and discharge efficiency can be improved.

In addition, the CAES power generation device 2 includes a control device 40. The control device 40 is configured by hardware including a sequencer and the like, and software implemented thereon. The control device 40 receives a charge command Lc according to the generated power from the power plant 6, a discharge command Lg according to the requested power from the power system 4, and a pressure measurement value from the pressure sensor 13. The control device 40 calculates the SOC of the first pressure accumulation tank 12 from the pressure measurement value from the pressure sensor 13, and controls, based on the calculated SOC, the valve 17, the inverter 34a of the motor 30, the converter 34b of the power generator 28, and the power regulator 34c of the heater 21. The control device 40 increases and decreases the SOC to regulate it within the optimal SOC range while satisfying the charge and discharge commands Lc, Lg, particularly satisfying the requested power from the power system 4. Accordingly, the valve 17, the inverter 34a, the converter 34b, and the power regulator 34c of the present embodiment are included in the SOC regulating unit of the present invention.

Figure 2:
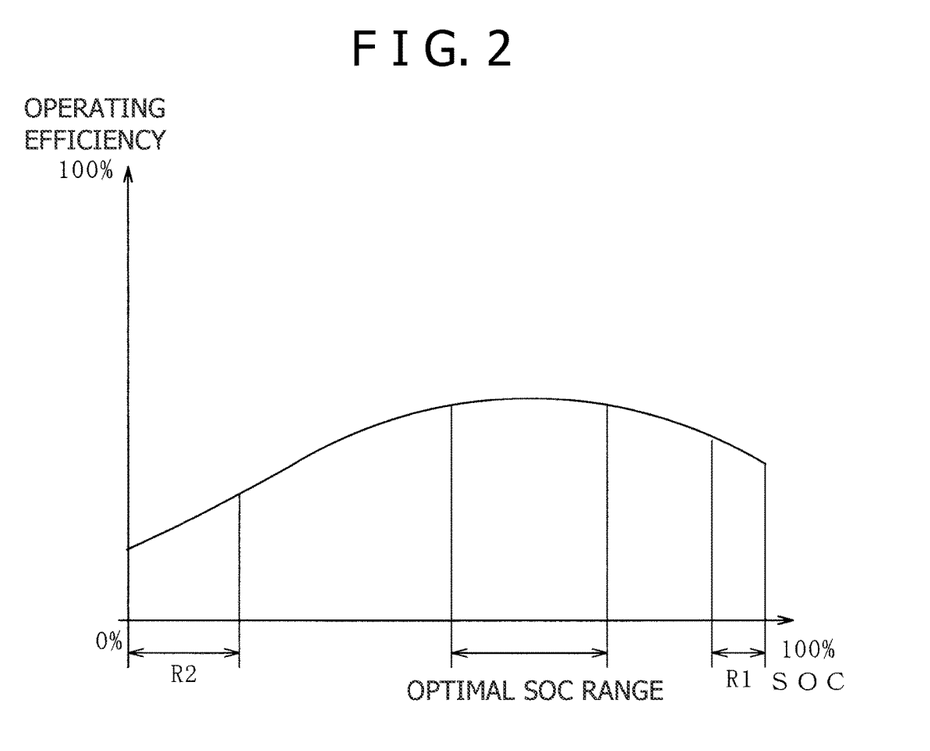
FIG. 2 is a graph showing a relationship between an SOC and an operating efficiency.

With reference to FIG. 2, the optimal SOC range is a range of SOC by which the operating efficiencies of the compressor 10 and the expander 14 are improved. Depending on a filling amount of the compressed air in the first pressure accumulation tank 12, the operating efficiency is changed. In FIG. 2, the SOC of the first pressure accumulation tank 12 is plotted on the horizontal axis, and in the operating efficiency is plotted on the vertical axis, and in the present embodiment, for example, the range of about 50% to 70% is the optimal SOC range and the operating efficiency in this range is high. Accordingly, operating the power generation device by regulating the SOC so as to be within the optimal SOC range is effective from the viewpoint of operating efficiency.

With reference to FIG. 1, when the SOC is larger than the optimal SOC range, the SOC is decreased by opening the valve 17, supplying the compressed air in the first pressure accumulation tank 12 to the expander 14, and driving the power generator 28 to generate power. Here, in a case of power generation including satisfying the requested power, the converter 34b may be controlled so as to increase a power generation load, and a lot of compressed air may be used. The generated power of the power generator 28 is supplied to the heater 21, the heat medium within the heat medium tank 20 is heated by the heater 21, and energy is stored as heat energy. In addition, the SOC may be decreased by opening the air release valve 11 provided at the first pressure accumulation tank 12 and releasing air within the first pressure accumulation tank 12. In this case, the air release valve 11 is included in the SOC regulating unit of the present invention.

When the SOC is smaller than the optimal SOC range, the SOC is increased by producing compressed air by the compressor 10 with the use of excess input power of the charge command Lc from the power plant 6 and supplying the compressed air to the first pressure accumulation tank 12. If excess input power from the power plant 6 does not exist, the SOC cannot be increased by this method. However, at the time of compression, the inverter 34a may be controlled so as to decrease a compression load, and a lot of compressed air may be produced.

In this way, the power generation device is operated within the optimal SOC range by regulating the SOC, and thereby the operating efficiency can be improved. In addition, by providing the heater 21, without wasting the power generated for decreasing the SOC, it is possible to convert power to heat energy in the heater 21 and store the heat energy.

Further, the control device 40 controls the SOC regulating unit to decrease the SOC when the SOC is within a predetermined high range R1, and controls the SOC regulating unit to increase the SOC when the SOC is within a predetermined low range R2. A specific method of increasing and decreasing SOC is the same as the above. Here, the upper limit of the predetermined high range R1 may be determined as the allowable pressure value of the first pressure accumulation tank 12. The lower limit of the predetermined high range R1 may be determined such that, even if the pressure of the first pressure accumulation tank 12 rises due to the delay in response of the pressure sensor 13 or the SOC regulating unit after detecting by the pressure sensor 13 that the pressure value of the first pressure accumulation tank 12 reaches the vicinity of the upper limit and starting regulation for decreasing the SOC, the pressure of the first pressure accumulation tank 12 does not rise to the upper limit. In the present embodiment, the predetermined high range R1 is a range in which the SOC is 90% to 100%, for example. In addition, the lower limit of the predetermined low range R2 may be determined as a state that the compressed air effectively usable for power generation does not exist in the first pressure accumulation tank 12. The upper limit of the predetermined low range R2 may be determined such that, even if the pressure of the first pressure accumulation tank 12 decreases due to the delay in response of the pressure sensor 13 or the SOC regulating unit after detecting by the pressure sensor 13 that the pressure reaches the vicinity of the lower limit and starting regulation for increasing the SOC, the pressure of the first pressure accumulation tank 12 does not decrease to the lower limit. In the present embodiment, the predetermined low range R2 is a range in which the SOC is 0% to 20%, for example.

By such an SOC control, it is possible to prevent the first pressure accumulation tank 12 from disabling further accumulation of pressure due to reaching a capacity upper limit, and prevent the first pressure accumulation tank 12 from disabling further generation of power due to reaching a capacity lower limit.

In addition, as a variation of the first embodiment, a power storage device (not shown) may be provided instead of the heater 21. By providing the power storage device, as with the case of storing energy as heat energy with the use of the heater 21, the generated power for decreasing the SOC can be stored as electric energy in the power storage device. Further, if the power stored in the power storage device is supplied to the motor 30 to drive the compressor 10, the SOC can be also increased.

Second Embodiment

Figure 3:
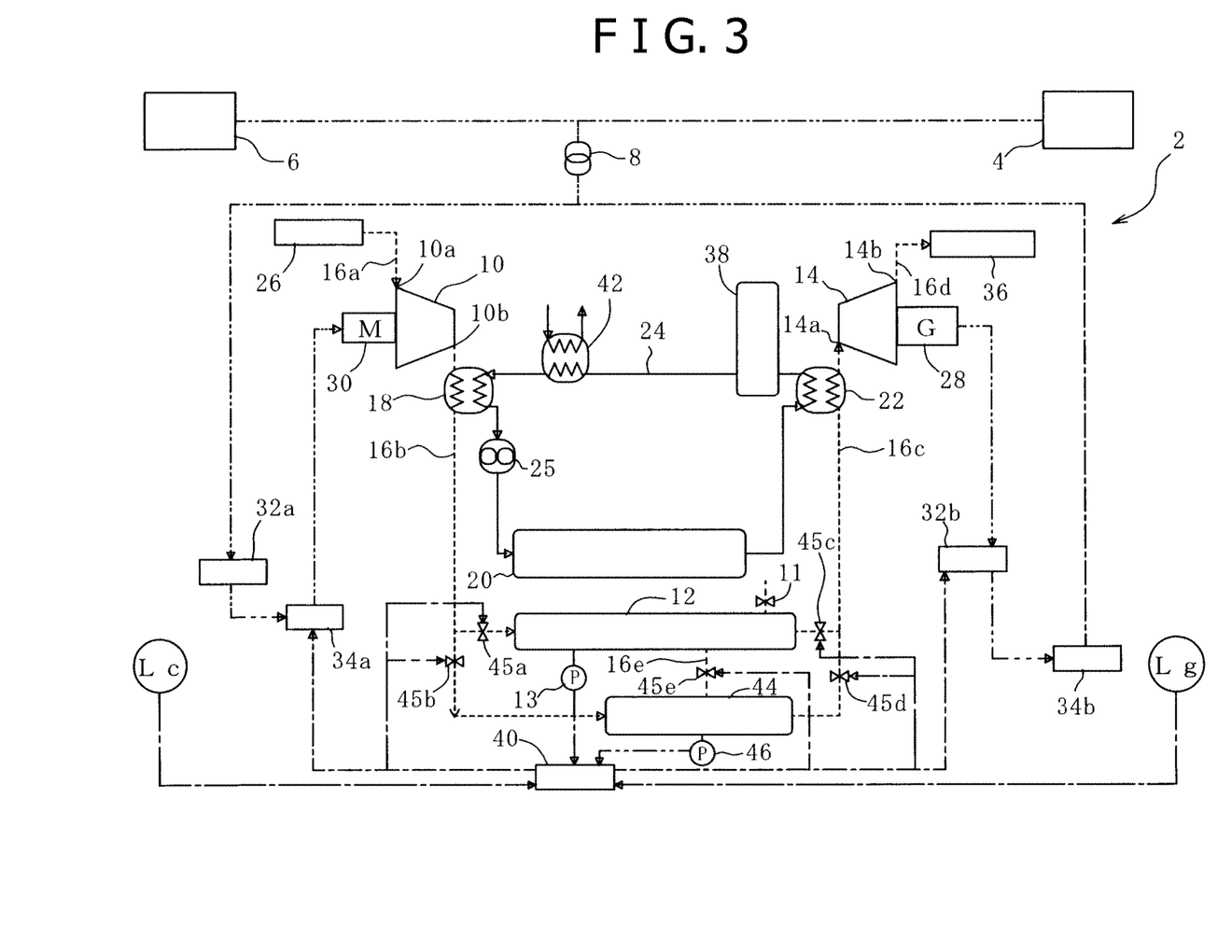
FIG. 3 is a schematic configuration diagram of a compressed air energy storage power generation device according to a second embodiment of the present invention.

FIG. 3 is a schematic configuration diagram of the CAES power generation device 2 of a second embodiment. The CAES power generation device 2 of the present embodiment has the configuration substantially same as that of the first embodiment of FIG. 1 except for the configuration of the portion where the heater 21 is omitted from the first embodiment and a second pressure accumulation tank 44 is provided. Therefore, descriptions of the configurations same as those shown in FIG. 1 will be omitted.

In the present embodiment, the discharge port 10b of the compressor 10 is fluidly connected through the air pipe 16b to the first pressure accumulation tank 12 and the second pressure accumulation tank 44. When the compressor 10 is driven by the motor 30, the compressor 10 suctions air through the suction port 10a, compresses the air and discharges the compressed air through the discharge port 10b, and then pumps the compressed air to the first pressure accumulation tank 12 and the second pressure accumulation tank 44. In the air pipe 16b extending from the compressor 10 to the first pressure accumulation tank 12 and the second pressure accumulation tank 44, valves 45a, 45b for permitting or blocking the flow of the compressed air are provided respectively. By opening or closing the valves 45a, 45b, it is possible to change to which of the first pressure accumulation tank 12 or the second pressure accumulation tank 44 the compressed air is supplied from the compressor 10.

The first pressure accumulation tank 12 and the second pressure accumulation tank 44 are arranged in parallel with one another in the air path, and store the compressed air pumped from the compressor 10. A pressure sensor 46 is installed at the second pressure accumulation tank 44, and it is possible to measure a pressure of the compressed air therein. The measured pressure value is output to the control device 40. The first pressure accumulation tank 12 and the second pressure accumulation tank 44 are fluidly connected through the air pipe 16c to the expander 14, and the compressed air stored in the first pressure accumulation tank 12 and the second pressure accumulation tank 44 is supplied through the air pipe 16c to the expander 14. In the air pipe 16c extending from the first pressure accumulation tank 12 and the second pressure accumulation tank 44 to the expander 14, valves 45c, 45d for permitting or blocking the flow of the compressed air are provided respectively. By opening or closing the valves 45c, 45d, it is possible to change from which of the first pressure accumulation tank 12 or the second pressure accumulation tank 44 the compressed air is supplied to the expander 14. In addition, the first pressure accumulation tank 12 and the second pressure accumulation tank 44 are directly connected by an air pipe 16e. A valve 45e is provided at the air pipe 16e, and by opening the valve 45e, it is possible to directly exchange air between the first pressure accumulation tank 12 and the second pressure accumulation tank 44.

The control device 40 of the present embodiment calculates the SOC of the first pressure accumulation tank 12 in response to the measurement value from the pressure sensors 13, 46, and based on the calculated SOC, controls the valves 45a to 45e and increases and decreases the SOC with the use of the second pressure accumulation tank 44 to regulate it within the optimal SOC range. Accordingly, the second pressure accumulation tank 44 and the valves 45a to 45e of the present embodiment are included in the SOC regulating unit of the present invention.

In the control of the present embodiment, when the SOC is larger than the optimal SOC range, in order not to increase the SOC, the compressed air is supplied to the second pressure accumulation tank 44 by opening the valve 45b and closing the valve 45a. In addition, in order to decrease the SOC, during power generation, the compressed air in the first pressure accumulation tank 12 is supplied to the expander 14 by opening the valve 45c and closing the valve 45d. When the internal pressure of the first pressure accumulation tank 12 is higher than the internal pressure of the second pressure accumulation tank 44, the compressed air in the first pressure accumulation tank 12 may be supplied to the second pressure accumulation tank 44 by opening the valve 45e.

When the SOC is smaller than the optimal SOC range, in order to increase the SOC, the compressed air is supplied to the first pressure accumulation tank 12 by opening the valve 45a and closing the valve 45b. In addition, in order not to decrease the SOC, during power generation, the compressed air in the second pressure accumulation tank 44 is supplied to the expander 14 by opening the valve 45d and closing the valve 45c. When the internal pressure of the first pressure accumulation tank 12 is lower than the internal pressure of the second pressure accumulation tank 44, the compressed air in the second pressure accumulation tank 44 may be supplied to the first pressure accumulation tank 12 by opening the valve 45e.

In each of the embodiments described herein, the object of power generation with renewable energy can target all those using energy which is steadily (or repetitively) supplemented with the forces of nature such as wind power, sunlight, solar heat, wave force or tidal power, and running water or tide and irregularly fluctuates. In addition, the object may be those power thereof fluctuates due to other equipment consuming large amount of power in the factory. Further, if the driving machine such as an engine machine is used without using the motor 30, the input power is unnecessary.

Hereinbefore, the specific embodiments of the present invention and the variation thereof have been described. However, the present invention is not limited to the above modes, and can be embodied by variously changing the modes within the gist of the present invention. For example, the mode made by appropriately combining the contents of the individual embodiments may be used as one embodiment of the present invention.

EXPLANATION OF REFERENCE NUMERALS

2: Compressed air energy storage power generation device (CAES power generation device)

4: Power system
6: Power plant
8: Power transmission/reception facility
10: Compressor
10a: Intake port
10b: Discharge port
11: Air release valve (SOC regulating unit)
12: First pressure accumulation tank (First pressure accumulation unit)
13: Pressure sensor (SOC detection unit)
14: Expander
14a: Air supply port
14b: Exhaust port
16a, 16b, 16c, 16d, 16e: Air pipe
17: Valve (SOC regulating unit)
18: First heat exchanger
20: Heat medium tank
21: Heater (Heating unit) (SOC regulating unit)
22: Second heat exchanger
24: Heat medium pipe
25: Pump
26: Intake filter
28: Power generator
30: Motor (Driving machine)
32a: Converter
32b: Inverter
34a: Inverter (SOC regulating unit)
34b: Converter (SOC regulating unit)
34c: Power regulator (SOC regulating unit)
36: Exhaust silencer
38: Heat medium return tank
40: Control device
42: Heat medium cooler
44: Second pressure accumulation tank (Second pressure accumulation unit) (SOC regulating unit)
45a, 45b, 45c, 45d, 45e: Valve (SOC regulating unit)
46: Pressure sensor

The invention claimed is:

1. A compressed air energy storage power generation device comprising:
   a compressor that is mechanically connected to a driving machine and compresses air;
   a first pressure accumulation unit that stores compressed air compressed by the compressor;
   an expander driven by compressed air supplied from the first pressure accumulation unit;
   a power generator mechanically connected to the expander;
   a first heat exchanger that exchanges heat between a heat medium and the compressed air supplied from the compressor to the first pressure accumulation unit;
   a second heat exchanger that exchanges heat between the heat medium and the compressed air supplied from the first pressure accumulation unit to the expander;
   an SOC detection unit that detects SOC of the first pressure accumulation unit;
   an SOC regulating unit that regulates the SOC of the first pressure accumulation unit; and
   a control device that controls the SOC regulating unit such that the SOC detected by the SOC detection unit is within an optimal SOC range which is based on operating efficiencies of the compressor and the expander while satisfying a requested power.

2. The compressed air energy storage power generation device according to claim 1, wherein the SOC regulating unit includes a heat storage unit that is fluidly connected to the first heat exchanger and the second heat exchanger and stores the heat medium, and a heating unit that heats the heat medium within the heat storage unit.

3. The compressed air energy storage power generation device according to claim 2, wherein when the SOC of the first pressure accumulation unit is larger than the optimal SOC range, the control device supplies the compressed air in the first pressure accumulation unit to the expander and drives the power generator to generate power, and supplies the generated power of the power generator to the heating unit.

4. The compressed air energy storage power generation device according to claim 1, wherein when the SOC of the first pressure accumulation unit is smaller than the optimal SOC range, the control device produces compressed air by the driving machine to supply the compressed air to the first pressure accumulation unit.

5. The compressed air energy storage power generation device according to claim 1, wherein the SOC regulating unit includes a second pressure accumulation unit.

6. The compressed air energy storage power generation device according to claim 5, wherein the control device supplies the compressed air to the second pressure accumulation unit and supplies the compressed air in the first pressure accumulation unit to the expander when the SOC of the first pressure accumulation unit is larger than the optimal SOC range, and supplies the compressed air in the first pressure accumulation unit to the second pressure accumulation unit when the internal pressure of the first pressure accumulation unit is higher than the internal pressure of the second pressure accumulation unit.

7. The compressed air energy storage power generation device according to claim 5, wherein the control device supplies the compressed air to the first pressure accumulation unit and supplies the compressed air in the second pressure accumulation unit to the expander when the SOC of the first pressure accumulation unit is smaller than the optimal SOC range, and supplies the compressed air in the second pressure accumulation unit to the first pressure accumulation unit when the internal pressure of the first pressure accumulation unit is lower than the internal pressure of the second pressure accumulation unit.

8. The compressed air energy storage power generation device according to claim 1, wherein the SOC regulating unit includes an air release valve for releasing the compressed air from the first pressure accumulation unit, and when the SOC of the first pressure accumulation unit is larger than the optimal SOC range, the control device opens the air release valve to release the compressed air from the first pressure accumulation unit.

9. The compressed air energy storage power generation device according to claim 1, wherein regardless of the requested power, the control device controls the SOC regulating unit to decrease the SOC when the SOC detected by the SOC detection unit is within a predetermined high range, and controls the SOC regulating unit to increase the SOC when the SOC detected by the SOC detection unit is within a predetermined low range.

10. A compressed air energy storage power generation method comprising:
    a step of compressing air;
    a step of cooling compressed air whose temperature is increased in the compression step;
    a step of storing the cooled compressed air in a first pressure accumulation unit;

a step of regulating an SOC of the first pressure accumulation unit so as to be within an optimal SOC range which is based on operating efficiencies of the compressor and the expander;

a step of heating the stored compressed air; and a step of generating power by expanding the heated compressed air.

11. The compressed air energy storage power generation device according to claim 2, wherein when the SOC of the first pressure accumulation unit is smaller than the optimal SOC range, the control device produces compressed air by the driving machine to supply the compressed air to the first pressure accumulation unit.

12. The compressed air energy storage power generation device according to claim 2, wherein the SOC regulating unit includes a second pressure accumulation unit.

13. The compressed air energy storage power generation device according to claim 2, wherein the SOC regulating unit includes an air release valve for releasing the compressed air from the first pressure accumulation unit, and when the SOC of the first pressure accumulation unit is larger than the optimal SOC range, the control device opens the air release valve to release the compressed air from the first pressure accumulation unit.

14. The compressed air energy storage power generation device according to claim 2, wherein regardless of the requested power, the control device controls the SOC regulating unit to decrease the SOC when the SOC detected by the SOC detection unit is within a predetermined high range, and controls the SOC regulating unit to increase the SOC when the SOC detected by the SOC detection unit is within a predetermined low range.

* * * * *